United States Patent Office 3,657,204
Patented Apr. 18, 1972

3,657,204
CURABLE AMORPHOUS OLEFINIC TERPOLY-MERS FROM ALPHA-OLEFINS AND POLY-CYCLIC POLYENES
Sebastiano Cesca, Arnaldo Roggero, and Ermanno Cinelli, San Donato Milanese, Italy, assignors to Snam Progetti S.p.A., Milan, Italy
No Drawing. Filed Dec. 18, 1969, Ser. No. 886,390
Claims priority, application Italy, Dec. 18, 1968, 25,239/68
Int. Cl. C08f 5/00, 15/40
U.S. Cl. 260—80.78
21 Claims

ABSTRACT OF THE DISCLOSURE

A new amorphous olefinic terpolymer that is readily curable, and which may be prepared by polymerizing a mixture of two different alpha-olefins having up to ten carbon atoms and a polycyclic polyene represented by the formula A—$(CH_2)_n$—B wherein A is a radical comprising at least one ring having an endomethylene group, B is a cyclodiene radical and $n$ is 0 to 5, is disclosed.

---

This invention relates to curable amorphous olefinic terpolymers and to a process for preparing these terpolymers.

Terpolymers are known which are formed from ethylene, propylene, or other alpha-olefins and, as the third monomer, dicyclopentadiene or a similar compound containing a double bond in the endomethylene ring and another in a second ring orthocondensed with the first.

It has, however, been observed that these terpolymers, whilst showing a high utilization of the diene monomer and a very good stability towards chemical agents on account of their low degree of unsaturation, suffer from the disadvantage of having a rather low curing rate. Furthermore, the vulcanization reaction sometimes continues ad infinitum, i.e. without having a real end. This drawback adversely affects the properties of the terpolymer and considerably limits its use, because, besides affecting the characteristics of the same polymer, it does not allow a satisfactory covulcanization with other usual elastomers having a high vulcanization rate.

It is therefore an object of the present invention to provide a terpolymer in which these disadvantages are reduced or absent.

According to one aspect of the present invention, there is provided a curable amorphous olefinic terpolymer of two different alpha-olefins having up to 10 carbon atoms, and a polycyclic polyene having the general formula A—$(CH_2)_n$—B, wherein A is a radical comprising at least one ring having an endomethylene group, B is a cyclodiene radical and $n$ is 0 or an integer of from 1 to 5.

The polycyclic polyene hydrocarbons which may be used in the present invention, together with the preparation of such hydrocarbons, are described and claimed in the related patent application, Ser. No. 886,389, filed Dec. 18, 1969 by three of us.

The term "terpolymer" is used herein to mean that the polymer is formed from at least three monomers, two of which will be alpha-olefins, and that the "termonomer" is one or a mixture of the specified polycyclic polyenes.

We have found that, if dicyclopentadiene and its homologues are replaced by a polycyclic polyene of the type specified above, the vulcanization rate of the resulting terpolymer is often over 100% greater than that of a corresponding terpolymer containing the dicyclopentadiene.

The terpolymers, according to the present invention, can be obtained by any one of the known methods of polymerization, examples of which will be described hereinbelow.

Examples of suitable alpha-olefins include ethylene, propylene, butenes, pentenes, methyl-pentenes and hexenes. Preferably use is made of the ethylene-propylene couple.

Examples of the radical A in the termonomer employed in the present invention include:

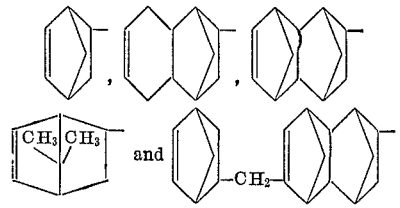

Examples of the radical B include the following:

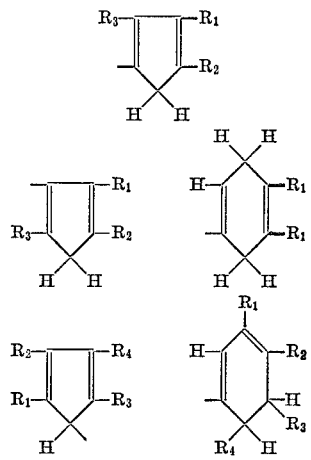

wherein each of $R_1$, $R_2$, $R_3$ and $R_4$, which may be the same or different, is a hydrogen atom or an alkyl radical having 1 to 5 carbon atoms.

Obviously it is possible to employ mixtures of the polyene compounds aforesaid instead of a single termonomer.

Examples of suitable termonomers include the following:

(I) 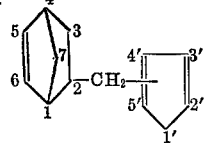

(2-norborn-5-enyl)-[4′ or 5′-(2′ or 3′ methyl)-cyclopentadienyl]-methane.

(II) 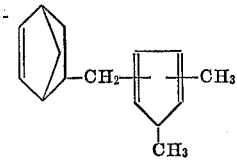

(2-norborn-5-enyl)-[4′ or 5′-(1′, 2′ or 3′ dimethyl)-cyclopentadienyl]-methane.

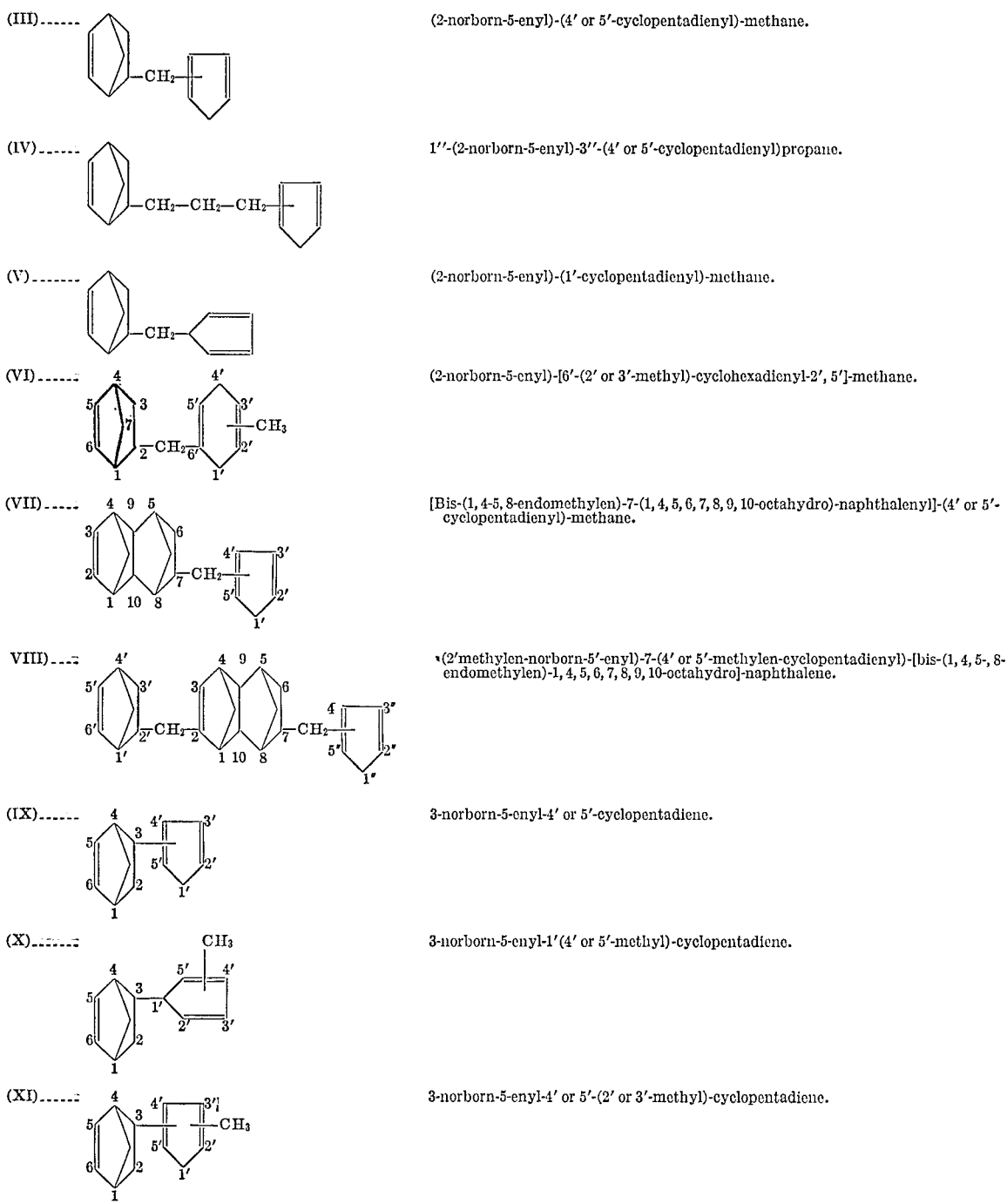

(III) (2-norborn-5-enyl)-(4' or 5'-cyclopentadienyl)-methane.

(IV) 1''-(2-norborn-5-enyl)-3''-(4' or 5'-cyclopentadienyl)propane.

(V) (2-norborn-5-enyl)-(1'-cyclopentadienyl)-methane.

(VI) (2-norborn-5-enyl)-[6'-(2' or 3'-methyl)-cyclohexadienyl-2', 5']-methane.

(VII) [Bis-(1,4-5,8-endomethylen)-7-(1,4,5,6,7,8,9,10-octahydro)-naphthalenyl]-(4' or 5'-cyclopentadienyl)-methane.

(VIII) ₁(2'methylen-norborn-5'-enyl)-7-(4' or 5'-methylen-cyclopentadienyl)-[bis-(1,4,5-,8-endomethylen)-1,4,5,6,7,8,9,10-octahydro]-naphthalene.

(IX) 3-norborn-5-enyl-4' or 5'-cyclopentadiene.

(X) 3-norborn-5-enyl-1'(4' or 5'-methyl)-cyclopentadiene.

(XI) 3-norborn-5-enyl-4' or 5'-(2' or 3'-methyl)-cyclopentadiene.

According to another aspect of the present invention, there is provided a process for preparing the inventive terpolymers, which comprises polymerizing a mixture of the two different alpha-olefins and the polycyclic polyene in the presence of a polymerization catalyst.

An example of a suitable polymerization catalyst comprises a compound of a transition metal of Groups IV to VIII of the Periodic Table and a reducing aluminum compound having the general formula $AlRX_1X_2 \cdot mZ$, wherein R is a hydrogen atom or a hydrocarbon radical having from 1 to 10 carbon atoms; each of $X_1$ and $X_2$, which may be the same or different, is a hydrogen atom, a hydrocarbon radical having from 1 to 10 carbon atoms, a halogen atom or a secondary amine radical; Z is a Lewis base and $m$ is 0 or an integer.

Examples of the aluminum compound include:

$Al(n-C_{10}H_{21})_3$
$Al(n-C_4H_9)_3$
$Al(C_2H_5)_2Cl$
$Al(i-C_4H_9)Cl_2$
$AlH_2N(CH_3)_2$
$AlH_3 \cdot N(CH_3)_3$
$Al(n-C_6H_{13})_3$
$AlCl_2(C_2H_5)$
$Al(i-C_4H_9)_2Cl$
$AlHCl_2 \cdot O(C_2H_5)_2$
$AlHClN(CH_3)_2$ Alternatively, the aluminum compound may be a polyiminoalane, for example one having in its molecule a group having the following formula

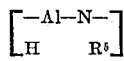

wherein $R^5$ represents an aryl, alkyl or cycloalkyl hydrocarbon radical.

Examples of the transition metal compound include $VCl_4$, $VOCl_3$, vanadium triacetylacetonate, $$VClO(OC_2H_5)_2$$

$VCl_3 \cdot 3THF$ and $TiCl_4$.

The polymerization reaction can be carried out in the presence of an inert hydrocarbon solvent or in the same monomers (alpha-olefins) kept in the liquid state.

The catalyst may be preformed in the presence or absence of one monomer or can be preformed in "situ." The temperatures are those usually employed in this type of reaction and may, for example, range from $-60°$ to $100°$ C.

Use is made of pressures between the pressure necessary to maintain at least partially the monomers in the liquid phase and 100 atmospheres, preferably from 1 to 80 atmospheres.

In the case when the two α-olefins are ethylene and propylene, the preferred ratio between these two monomers ranges from 1:4 to 4:1, preferably from 1.5:1 to 1:1.5. Preferably, the polyene constitutes from 1 to 20% by weight of the terpolymer.

The present invention is now illustrated by the following examples. In the examples the course of the vulcanization reaction is studied by the torque registered by an oscillating plate vulcameter (rheometer) (Zwick type) during the vulcanization. The torque is proportional to the degree of vulcanization. It is assumed that the maximum variation of the torque is the difference between the torque measured after the first 250 minutes of vulcanization, and the torque initially measured, i.e. $G_{250} - G_{min} = G_{max}$; furthermore, it is assumed that the concentration of double bonds at a time $t$ is $G_{250} - G_t$, i.e. the difference between the assumed maximum and the torque at time $t$. The vulcanization rates, measured under the specified conditions, with a sulphur excess, depend substantially only on the concentration of double bonds.

The course of the vulcanization reaction satisfies a kinetic equation of the second order which may be expressed as follows:

$$\frac{dG_t}{dt} = K(G_{max} - G_t)^2$$

From this it is possible to evaluate the vulcanization rate constant K, once $G_{max}$ and $t_{90}$, which is the time required to obtain 90% of $G_{max} - G_{min}$, are known, using the following equation.

$$K = \frac{1}{G_{max} \cdot t_{90}}$$

EXAMPLE 1

1000 ml. of n-hexane were introduced into a 1500 ml. tubular reactor equipped with a mechanical stirrer, a thermometer sheath and a jacket for thermostatically controlled fluid, in an inert atmosphere. At the same time, a mixture of propylene and ethylene having a molar ratio of 2:1 and a flow rate of 1200 litres (measured under standard conditions) per hour was fed to the bottom of the reactor. In order to facilitate the attainment of the saturation equilibrium, the solvent was stirred while the gas was introduced, and the temperature of the solvent was kept at 0° C. by circulating in the reactor jacket a cooling mixture controlled by a cryostat.

After the monomer mixture had been blown in for 20 minutes, the equilibrium was assumed to have been attained. The reactor was then charged with 3.2 mmoles/l. of $(C_2H_5)_2AlCl$ 10.7 mmoles/l. of 2-norborn-5-enyl-4' or 5' (2' or 3' methyl) cyclopentadienyl methane (having the foregoing Formula I); while the gaseous monomer stream was continued the polymerization reaction was primed by introducing 0.4 mmole/l. of vanadium triacetylacetonate. The polymerization continued for 9 minutes; it was stopped by the addition to the reactor of 1 ml. of n-butanol. The reaction solution was washed with water, acidified with HCl, and again with water until neutrality was attained; then it was coagulated by the slow addition of an excess of acetone which comprised the amine anti-oxidant AO 4010. After drying at a reduced pressure at 50° C. for 15 hours an elastomeric mass was obtained which appeared similar to uncured rubber, weighing 13.7 g. Upon X-ray examination it proved to be essentially amorphous and showed a $C_2$ content of 60% by weight, while its intrinsic viscosity, measured in toluene at 30° C., was 1.3 dl./g. The iodometric test gave a termonomer (I) content of 7% by weight in the terpolymer.

A fraction of the terpolymer was subjected to curing in an oscillating plate Zwick rheometer having a twist angle $\overset{\wedge}{\alpha} = 1.5$, using the following formulation:

| | Parts |
|---|---|
| Polymer | 100 |
| HAF black (carbon) | 50 |
| ZnO | 5 |
| Circosol 4240 | 5 |
| MBT (MBT=mercaptobenzothiazole) | 0.5 |
| TMTS (TMTS=tetramethyltiuramedisulphide) | 1 |
| Sulphur | 2 |

Vulcanization temperature: 145° C.

The following results were obtained:

$t_i =$ (induction time) 30″

$t_{90} =$ (time required to obtain 90% of the maximum modulus) = 17′

K, which is the rate constant for the whole vulcanization reaction = 0.855 (min.$^{-1}$.m.$^{-1}$.kg.$^{-1}$); and $G_{max}$ = 0.534 m. kg., where $G_{max}$ is the maximum torque measured at the end of the vulcanization.

A hexane solution of a terpolymer sample showed upon UV examination an absorption at 249 mμ which can be ascribed to the conjugated double bonds of the cyclopentadiene ring.

By way of comparison, a terpolymer sample was prepared containing dicyclopentadiene instead of terpolymer I, under the same conditions as those described above. The sample showed $[\eta] = 1.20$ dl./g. and a dicyclopentadiene content of 6.5%. After vulcanization under the same aforesaid conditions, the following results were obtained:

$t_i =$ 5 minutes
$t_{90} =$ 101′30″
K = 0.128 (min.$^{-1}$ m.$^{-1}$ kg.$^{-1}$)
$G_{max}$ = 0.488 (m. Kg.)

These results emphasize the higher vulcanization rate of the terpolymers comprising compounds of type (I).

EXAMPLE 2

Using an apparatus similar to that in the preceding example, a terpolymer was prepared by employing as the termonomer, (2-norborn-5-enyl)-[4' or 5'-(1', 2', or 3'-dimethyl)-cyclopentadienyl]-methane having the foregoing Formula II, toluene instead of n-hexane, and, as the catalyst system $VO(OBut)_3$ (1 mmole/l.) and $Al(C_2H_5)_2Cl$ (10 mmoles/l.). The termonomer content was 5.35 mmoles/l. After 7'30″ of terpolymerization 21.2 g. of a terpolymer were obtained which had a compound II content of 3.72% by weight, an intrinsic viscosity of 2.47 dl. g. and an ethylene content of 65%. The technological data obtained are as follows:

$t_i=1'$
$t_{90}=38'$
$K=0.89$ (min.$^{-1}$ kg.$^{-1}$ m.$^{-1}$)
$G_{max}=0.492$ (m. kg.)

EXAMPLE 3

Following the procedure of Example 1, but operating in toluene at 0° C. with a V(AcAc)$_3$ (0.4 mmole/l.)-AlEt$_2$Cl (3.2 mmole/l.) catalyst and employing an amount of (2-norborn-5-enyl)-(4' or 5'-cyclopentadienyl)-methane (having the foregoing Formula III) equal to 5.35 mmoles/l., adding 0.89 mmole every minute until all is added, there were obtained after 7 minutes 22.1 g. of a terpolymer having [η]=1.29 dl./g., a degree of unsaturation of 4.7% and a C$_2$ content of 60%. The technological results obtained are:

$t_i=2'30''$
$t_{90}=53'$
$K=0.263$ (min.$^{-1}$ kg.$^{-1}$ m.$^{-1}$)
$G_{max}=0.380$ (m. kg.)

EXAMPLE 4

By following the procedure of Example 1 but operating in toluene at −20° C. with VCl$_4$ (0.5 mmole/l.) AlEt$_2$Cl (4 mmoles/l.) and anisole (2 mmoles/l.) and employing 5.85 mmoles/l. of 1''-[2-norborn-5-enyl]-3''-[4'- or 5'-cyclopentadienyl]-propane (having the Formula IV), adding 0.89 mmole every 30'' until exhaustion of the termonomer, there were obtained, after 3'30'', 20.35 g. of a terpolymer having [η]=1.95; the termonomer percent=4.32 and the C$_2$%=54%. The technological data obtained are:

$t_i=2'$
$t_{90}=51'30''$
$K=$(m.$^{-1}$ kg.$^{-1}$ min.$^{-1}$)=1.033
$G_{max}=0.406$

EXAMPLE 5

Operating according to the procedure of Example 1, there were used, as a catalyst system, AlEt$_2$Cl (3.2 mmoles/l.) and V(acetylacetonate)$_3$ (0.4 mmole/l.), n-heptane (1000 ml.) and, as the termonomer, a mixture of the compounds having Formulae V and III (11.5 mmoles/l.). The temperature was kept constant at 0° C. The monomer was divided into portions and diluted in 30 ml. of n-heptane. 5 ml. of this solution were added at the beginning of the test and then 3 ml. were added every 30'' until exhaustion of the monomer.

After 6'30'', 22 g. of a polymer were obtained, having [η]=1.3 dl./g., C$_2$=60% and a polyene content of 7% by weight.

The technological tests were as follows:

$t_i=1'30''$
$t_{90}=31''30''$
$K=$(min.$^{-1}$ m.$^{-1}$ kg.$^{-1}$)=0.489
$G_{max}=0.632$

EXAMPLE 6

Following the procedure of Example 1, there were employed VO(OBut)$_3$ (1 mmole/l.), AlEt$_2$Cl (10 mmoles/l.) in 1000 ml. of toluene at 0° C., and an amount of (2-norborn-5-enyl)-[6'-(2' or 3'-dimethyl)-cyclohexadienyl-2,5]-methane (having the aforesaid Formula VI) equal to 11.5 mmoles/l. 11.5 mmoles were dissolved in 30 ml. of toluene; 10 ml. were added at the beginning; and 2.5 ml. were added every 30'' until exhaustion of the termonomer solution. After 8', 16 g. of terpolymer were obtained, having the following characteristics: [η]=2 dl./g.; C$_2$=59% and termonomer=7%. The technological properties were:

$t_i=2'$
$t_{90}=48'$
$K=$(min.$^{-1}$ m.$^{-1}$ kg.$^{-1}$)=0.443
$G_{max}=0.595$

EXAMPLE 7

The procedure of Example 6 was repeated, except using as the termonomer 5.8 mmoles of [bis(1,4,4,8-endo-methylen)-7-(1,4,5,6,7,8,9,10 - octahydro-naphthalenyl]-4' or 5'-cyclopentadienyl)-methane (having the aforesaid Formula VII), which was proportioned and added as aforesaid.

Using VO(But)$_3$ (0.8 mmole/l.) and AlEt$_2$Cl (8 mmoles/l.) after 7', 12.6 g. of a terpolymer were obtained, having the following properties [η]=1.99 dl./g.; C$_2$=60%; and a termonomer content of 4.2% by weight.

EXAMPLE 8

By operating according to the procedure of Example 6, use was made of VCl$_4$ (1 mmole/l.), AlEt$_2$Cl (8 mmoles/l.) and anisole (4 mmoles/l.) and 11.5 mmoles/l. of the termonomer having the aforesaid Formula VIII, carrying out the reaction at −20° C.

The termonomer was divided in this way: 11.5 moles/l. were diluted in 30 ml. of toluene and 5 ml. of this solution were dropped per minute. After 8', 18.2 g. of a terpolymer were obtained giving the following characteristics: [η]=1.99 dl./g.; percent termonomer=5.6; and percent C$_2$=54.

EXAMPLE 9

By operating according to the procedure of Example 1, use was made of a mixture of isomers having the Formulae X and XI, having a concentration of 12.5 mmole/l. After 6' of terpolymerization, 14.9 g. of an elastomer were obtained having: [η]=1.3 dl./g.; C$_2$=61%; and termonomer=6%.

After vulcanization, according to the usual formulation, the following results were obtained:

$t_i=1'30''$
$t_{90}=36'$
$K=$(min.$^{-1}$ kg.$^{-1}$ m.$^{-1}$)=0.51
$G_{max}=0.52$ (kg. m.)

What we claim is:
1. A curable amorphous olefinic terpolymer of two different alpha-olefins having up to 10 carbon atoms, and a polycyclic polyene having the general formula

wherein A is a radical comprising at least one ring having an endomethylene group, B is a cyclodiene radical and $n$ is 0 to 5.

2. A terpolymer as claimed in claim 1, wherein the concentration of polycyclic polyene in the terpolymer is from 1 to 20% by weight.

3. A terpolymer as claimed in claim 1 wherein the radical A is a member of the group represented by the following formulae:

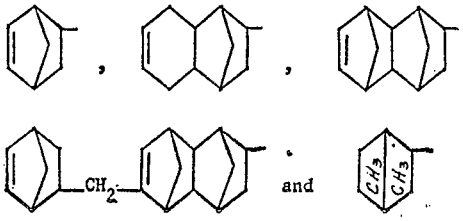

4. A terpolymer as claimed in claim 1, wherein the radical B is a member of the group represented by the following formulae:

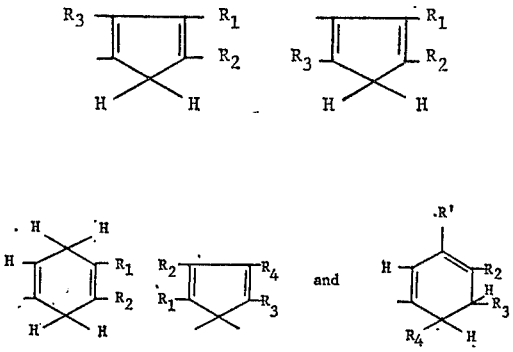

wherein each of $R_1$, $R_2$, $R_3$ and $R_4$, which may be different, is a member of the group consisting of hydrogen and an alkyl radical having from 1 to 5 carbon atoms.

5. A terpolymer as claimed in claim 1 wherein the termonomer is a member of the group consisting of a compound represented by the foregoing Formulae I to XI, and mixtures thereof.

6. A terpolymer as claimed in claim 1, wherein one of the alpha-olefins is ethylene.

7. A terpolymer as claimed in claim 1, wherein one of the alpha-olefins is propylene.

8. A terpolymer as claimed in claim 6 wherein the other alpha-olefin is propylene and the ratio between ethylene and propylene is from 1:4 and 4:1.

9. A terpolymer as claimed in claim 8, wherein the ratio between ethylene and propylene is from 1.5:1 to 1:1.5.

10. Process for preparing a terpolymer as claimed in claim 1, which comprises polymerizing a mixture of the two different alpha-olefins and the polycyclic polyene in the presence of a polymerization catalyst which is a compound of a transition metal of Groups IV to VIII of the Periodic Table and an aluminum compound having the formula $AlR^1X^1X^2mZ$ wherein $R^1$ is a member of the group consisting of hydrogen and an alkyl group having from 1 to 10 carbon atoms; each of $X^1$ and $X^2$, which may be different, is a member of the group consisting of hydrogen, halogen, an alkyl group having from 1 to 10 carbon atoms; and a secondary amine group; Z is a Lewis base; and $m$ is 1 to 2.

11. Process according to claim 10 wherein the aluminum compound is a member of the group consisting of $Al(n-C_{10}H_{21})_3$
$Al(n-C_4H_9)_3$
$Al(C_2H_5)_2Cl$
$Al(i-C_4H_9)Cl_2$
$AlH_2N(CH_3)_2$
$AlH_3 \cdot N(CH_3)_3$
$Al(n-C_6H_{13})_3$
$AlCl_2(C_2H_5)$
$Al(i-C_4H_9)_2Cl$
$AlHCl_2 \cdot O(C_2H_5)_2$
$AlHClN(CH_3)_2$

12. Process according to claim 10, wherein the polymerization catalyst comprises a compound of a transition metal of Groups IV to VIII of the Periodic Table and a polyimino-alane.

13. Process according to claim 12, wherein the polyimino-alane contains in its molecule groups having the formula

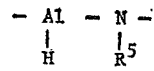

wherein $R^5$ represents a member of the group consisting of alkyl, aryl and cycloalkyl hydrocarbon radicals.

14. Process according to claim 10, wherein the transition metal compound is a member of the group consisting of $VCl_4$, $VOCl_3$, vanadium triacetylacetonate, $VClO(OC_2H_5)_2$, $VCl_3 \cdot 3THF$ and $TiCl_4$.

15. Process according to claim 10, wherein the polymerization is effected in the presence of an inert solvent.

16. Process according to claim 10, wherein the polymerization is effected at a pressure of up to 100 atmospheres.

17. Process according to claim 16, wherein the polymerization is effected at a pressure of from 1 to 80 atmospheres.

18. Process according to claim 10, wherein the polymerization is effected at a temperature of from $-60$ to $+100°$ C.

19. A vulcanizable amorphous terpolymer whenever produced by the process claimed in claim 10.

20. Process according to claim 10, which further comprises vulcanizing the vulcanizable amorphous terpolymer.

21. An elastomeric material comprising a vulcanizable terpolymer as claimed in claim 1.

References Cited
UNITED STATES PATENTS

| | | | |
|---|---|---|---|
| 3,464,959 | 9/1969 | Marconi et al. | 260—79.5 |
| 3,470,138 | 9/1969 | Marconi et al. | 260—80.78 |

JOSEPH L. SCHOFER, Primary Examiner

R. A. GAITHER, Assistant Examiner

U.S. Cl. X.R.

260—88.2 E

UNITED STATES PATENT OFFICE
CERTIFICATE OF CORRECTION

Patent No. 3,657,204     Dated April 18, 1972

Inventor(s) Sebastiano Cesca, et al

It is certified that error appears in the above-identified patent and that said Letters Patent are hereby corrected as shown below:

Column 2, line 40, correct the second formula as follows:

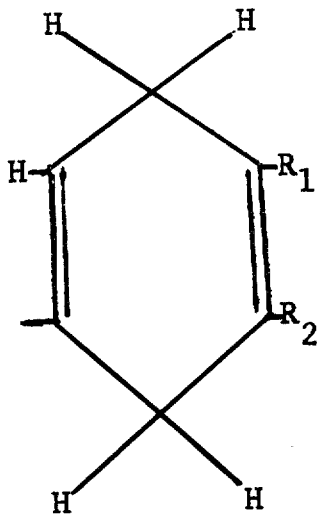

Column 6, line 4, before "10,7" insert --and--.

Column 7, line 61, correct " 31"30" " to read --31'30"--.

Column 8, line 16, after "Using" change "$VO(But)_3$" to read -- $VO(OBut)_3$ --.

Signed and sealed this 19th day of February 1974.

(SEAL)
Attest:

EDWARD M. FLETCHER, JR.      C. MARSHALL DANN
Attesting Officer     Commissioner of Patents